W. C. McCARTY.
CUSHIONED VEHICLE WHEEL.
APPLICATION FILED DEC. 2, 1908.

924,621.

Patented June 8, 1909.

Witnesses

Inventor
William C. McCarty,
By Franklin H. Hough
Attorney

UNITED STATES PATENT OFFICE.

WILLIAM C. McCARTY, OF BIRMINGHAM, ALABAMA.

CUSHIONED VEHICLE-WHEEL.

No. 924,621.  Specification of Letters Patent.  Patented June 8, 1909.

Application filed December 2, 1908. Serial No. 465,604.

*To all whom it may concern:*

Be it known that I, WILLIAM C. MCCARTY, a citizen of the United States, residing at Birmingham, in the county of Jefferson and State of Alabama, have invented certain new and useful Improvements in Cushioned Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to new and useful improvements in cushion tires adapted especially for automobiles, etc., and comprises various details of construction, combinations and arrangements of parts which will be hereinafter fully described and then specifically defined in the appended claims.

I illustrate my invention in the accompanying drawings, in which:—

Figure 1:
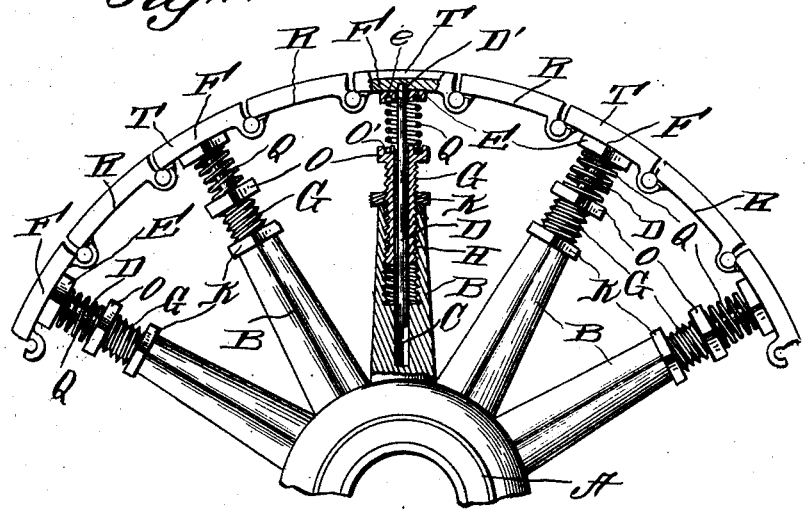
Figure 2:
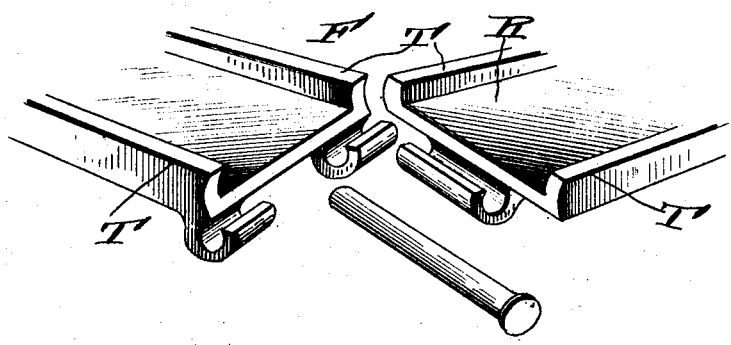

Figure 1 is a side elevation of a portion of the wheel embodying the features of my invention, one of the spokes being shown in longitudinal section, and Fig. 2 is a detail perspective view.

Reference now being had to the details of the drawings by letter, A designates the hub of a wheel and B the spokes, each of said spokes having a longitudinal recess C therein.

D is a bar mounted one in each of said recesses and its outer end is threaded, as at D', and engages a nut E fastened to the rim section F in any suitable manner.

G designates a hollow screw through which the threads of said screw engage threads H formed in the wall of the recess in the spoke.
K designates a jam nut which is mounted upon the screw G and adapted to bear against the end of the spoke. A nut O is mounted upon the threaded end of the screw G and has a groove O' formed in its outer space. A spring Q is interposed between the nut O and has one end seated in a groove O' thereof, while the other end of the spring engages a groove e formed in the inner surface of the nut E.

To each of the rim sections F is hinged an intermediate section R, the hinges being at the ends of the inner concaved surface thereof. Ribs T project from the opposite edges of the rim sections, thus leaving a space between the same within which any filler may be inserted, if desired.

From the foregoing, it will be noted that, by the provision of a vehicle wheel made as shown and described, a pneumatic tire may be dispensed with and the vibration coming upon the rim will be taken up by the springs, the tension of which may be readily regulated by the mechanism shown and described.

What I claim to be new is:—

A cushion vehicle wheel, comprising a hub with hollow spokes, a hollow threaded shell mounted in the end of each spoke and having a flanged end with a groove in the edge thereof, a pivotal link rim, a threaded rod projecting from each link opposite the end of a spoke and extending through said hollow shell and guided in a hole within the spoke, a nut fitted upon the threaded circumference of said shell, a nut fitted upon the threaded portion of said rod and having a groove in the face thereof, a spring engaging the groove in the flange of said shell and said nut, as shown and described.

In testimony whereof I hereunto affix my signature in the presence of two witnesses.

WILLIAM C. McCARTY.

Witnesses:
C. F. MANLY,
J. HICKMAN.